US012565092B2

(12) United States Patent
Jomaa et al.

(10) Patent No.: US 12,565,092 B2
(45) Date of Patent: Mar. 3, 2026

(54) BUS BAR ROUTING CONFIGURATIONS FOR TRACTION BATTERY PACKS

(71) Applicant: FORD GLOBAL TECHNOLOGIES, LLC, Dearborn, MI (US)

(72) Inventors: Zeinab Jomaa, Dearborn, MI (US); Alex Revels, Canton, MI (US); Michael E. Reibling, Sterling Heights, MI (US); Deanna Marie Winton Hoffman, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 345 days.

(21) Appl. No.: 18/306,418

(22) Filed: Apr. 25, 2023

(65) Prior Publication Data

US 2024/0075802 A1 Mar. 7, 2024

Related U.S. Application Data

(60) Provisional application No. 63/403,445, filed on Sep. 2, 2022.

(51) Int. Cl.
| | |
|---|---|
| B60K 1/04 | (2019.01) |
| B60L 50/64 | (2019.01) |
| H01M 10/658 | (2014.01) |
| H01M 50/204 | (2021.01) |
| H01M 50/505 | (2021.01) |

(52) U.S. Cl.
CPC ................ B60K 1/04 (2013.01); B60L 50/64 (2019.02); H01M 10/658 (2015.04); H01M 50/204 (2021.01); H01M 50/505 (2021.01); H01M 2220/20 (2013.01)

(58) Field of Classification Search
CPC . B60K 1/04; B60K 6/28; B60L 50/64; H01M 10/658; H01M 50/505; H01M 50/204; H01M 2220/20
USPC ........................................................ 180/68.5
See application file for complete search history.

(56) References Cited

U.S. PATENT DOCUMENTS

| | | | | |
|---|---|---|---|---|
| 9,118,094 | B2 * | 8/2015 | Tsujimura | H01M 10/613 |
| 9,444,082 | B2 * | 9/2016 | Tsujimura | B60L 58/21 |
| 9,758,030 | B2 * | 9/2017 | Newman | H01M 10/625 |
| 9,806,308 | B2 * | 10/2017 | Watanabe | H01M 50/147 |
| 10,017,037 | B2 * | 7/2018 | Newman | H01M 50/271 |
| 10,062,877 | B2 * | 8/2018 | Lee | H01M 50/503 |
| 10,158,106 | B2 * | 12/2018 | Marpu | B60K 6/28 |
| 10,486,516 | B2 * | 11/2019 | Yamanaka | B62D 21/02 |
| 10,637,110 | B1 * | 4/2020 | Tsai | H01M 10/6567 |

(Continued)

FOREIGN PATENT DOCUMENTS

| | | |
|---|---|---|
| WO | 2014178567 A1 | 11/2014 |
| WO | 2019066229 A1 | 4/2019 |
| WO | 2022261364 A1 | 12/2022 |

*Primary Examiner* — Hau V Phan
(74) *Attorney, Agent, or Firm* — David B. Kelley; Carlson, Gaskey & Olds, P.C.

(57) ABSTRACT

Bus bar routing configurations are provided for traction battery packs. Exemplary routing configurations may position the bus bar over top of one or more cells stacks of the traction battery pack. A structural cross-member beam of each cell stack may include a notch for accommodating the bus bar. The bus bar may therefore be conveniently nested within the cross-member beam without increasing the vertical or "z-axis" footprint of the traction battery pack.

20 Claims, 5 Drawing Sheets

(56) References Cited

U.S. PATENT DOCUMENTS

| 11,148,819 | B2 * | 10/2021 | Demont | ............ | H01M 10/6562 |
| 2009/0142650 | A1 * | 6/2009 | Okada | ............... | H01M 10/6563 |
| | | | | | 429/71 |
| 2009/0162737 | A1 * | 6/2009 | Lai | ...................... | H01M 50/503 |
| | | | | | 429/56 |
| 2018/0034034 | A1 | 2/2018 | Kimoto et al. | | |
| 2019/0363326 | A1 | 11/2019 | Chen et al. | | |
| 2020/0243929 | A1 * | 7/2020 | Darbandi | .............. | H02J 7/0031 |
| 2022/0271398 | A1 * | 8/2022 | Park | .................... | H01M 50/249 |

* cited by examiner

BUS BAR ROUTING CONFIGURATIONS FOR TRACTION BATTERY PACKS

CROSS-REFERENCE TO RELATED APPLICATIONS

This disclosure claims priority to U.S. Provisional Application No. 63/403,445, which was filed on Sep. 2, 2022 and is incorporated herein by reference.

TECHNICAL FIELD

This disclosure relates generally to traction battery packs, and more particularly to configurations for routing bus bars over structural cross-member beams of a traction battery pack.

BACKGROUND

Electrified vehicles include a traction battery pack for powering electric machines and other electrical loads of the vehicle. The traction battery pack includes a plurality of battery cells and various other battery internal components that support electric vehicle propulsion.

SUMMARY

A traction battery pack according to an exemplary aspect of the present disclosure includes, among other things, a cell stack including a plurality of battery cells supported between a first cross-member beam and a second cross-member beam. A bus bar is positioned within a notch formed in the first cross-member beam or the second cross-member beam.

In a further non-limiting embodiment of the foregoing traction battery pack, a third cross-member beam is positioned adjacent to the first cross-member beam to establish a cross-member assembly that separates the cell stack from a second cell stack of the traction battery pack.

In a further non-limiting embodiment of either of the foregoing traction battery packs, a venting passageway is disposed between the first cross-member beam and the third cross-member beam.

In a further non-limiting embodiment of any of the foregoing traction battery packs, the notch is formed in the first cross-member beam, and further comprising a second notch formed in the second cross-member beam.

In a further non-limiting embodiment of any of the foregoing traction battery packs, the bus bar is received within the notch and the second notch and laterally spans across a top of the cell stack.

In a further non-limiting embodiment of any of the foregoing traction battery packs, the bus bar extends directly over top of a battery cell packet of the cell stack.

In a further non-limiting embodiment of any of the foregoing traction battery packs, the bus bar extends axially between a first structural thermal barrier and a second structural thermal barrier of the cell stack.

In a further non-limiting embodiment of any of the foregoing traction battery packs, a battery cell packet of the cell stack is arranged between the first structural thermal barrier and the second structural thermal barrier.

In a further non-limiting embodiment of any of the foregoing traction battery packs, the first cross-member beam includes a beam body, a first reinforcement section that establishes a first pultrusion within an upper portion of the beam body, and a second reinforcement section that establishes a second pultrusion within a lower portion of the beam body.

In a further non-limiting embodiment of any of the foregoing traction battery packs, the notch extends from an upper plateau of the upper portion to the first reinforcement section.

In a further non-limiting embodiment of any of the foregoing traction battery packs, an upper surface of the bus bar is flush relative to the upper plateau.

In a further non-limiting embodiment of any of the foregoing traction battery packs, the bus bar is supported by the first pultrusion.

In a further non-limiting embodiment of any of the foregoing traction battery packs, the bus bar spans across a width of the cell stack and at least a portion of a width of a second cell stack of the traction battery pack.

A traction battery pack according to another exemplary aspect of the present disclosure includes, among other things, a first cross-member beam, a second cross-member beam, and a plurality of battery cells supported between the first cross-member beam and the second cross-member beam. A bus bar is received within a first notch formed in the first cross-member beam and a second notch formed in the second cross-member beam, and the bus bar extends laterally over top of a cell packet of the plurality of battery cells.

In a further non-limiting embodiment of the foregoing traction battery pack, each of the first cross-member beam and the second cross-member beam includes a beam body and a first reinforcement section and a second reinforcement section configured to structurally reinforce the beam body.

In a further non-limiting embodiment of either of the foregoing traction battery packs, the first reinforcement section and the second reinforcement section are pultrusions of the first cross-member beam.

In a further non-limiting embodiment of any of the foregoing traction battery packs, the bus bar is supported by the first reinforcement section of the first cross-member beam and the second cross-member beam.

In a further non-limiting embodiment of any of the foregoing traction battery packs, the first notch extends from an upper plateau of the beam body to the first reinforcement section.

In a further non-limiting embodiment of any of the foregoing traction battery packs, the cell packet is a sub-grouping of the plurality of battery cells that is positioned between a first structural thermal barrier and a second structural thermal barrier.

In a further non-limiting embodiment of any of the foregoing traction battery packs, the bus bar extends axially between the first structural thermal barrier and the second structural thermal barrier.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details bus bar routing configurations for traction battery packs. Exemplary routing configurations may position the bus bar over top of one or more cells stacks of the traction battery pack. A structural cross-member beam of each cell stack may include a notch for accommodating the bus bar. The bus bar may therefore be conveniently nested within the cross-member beam without increasing the vertical or "z-axis" footprint of the traction battery pack. These and other features are discussed in greater detail in the following paragraphs of this detailed description.

Figure 1:
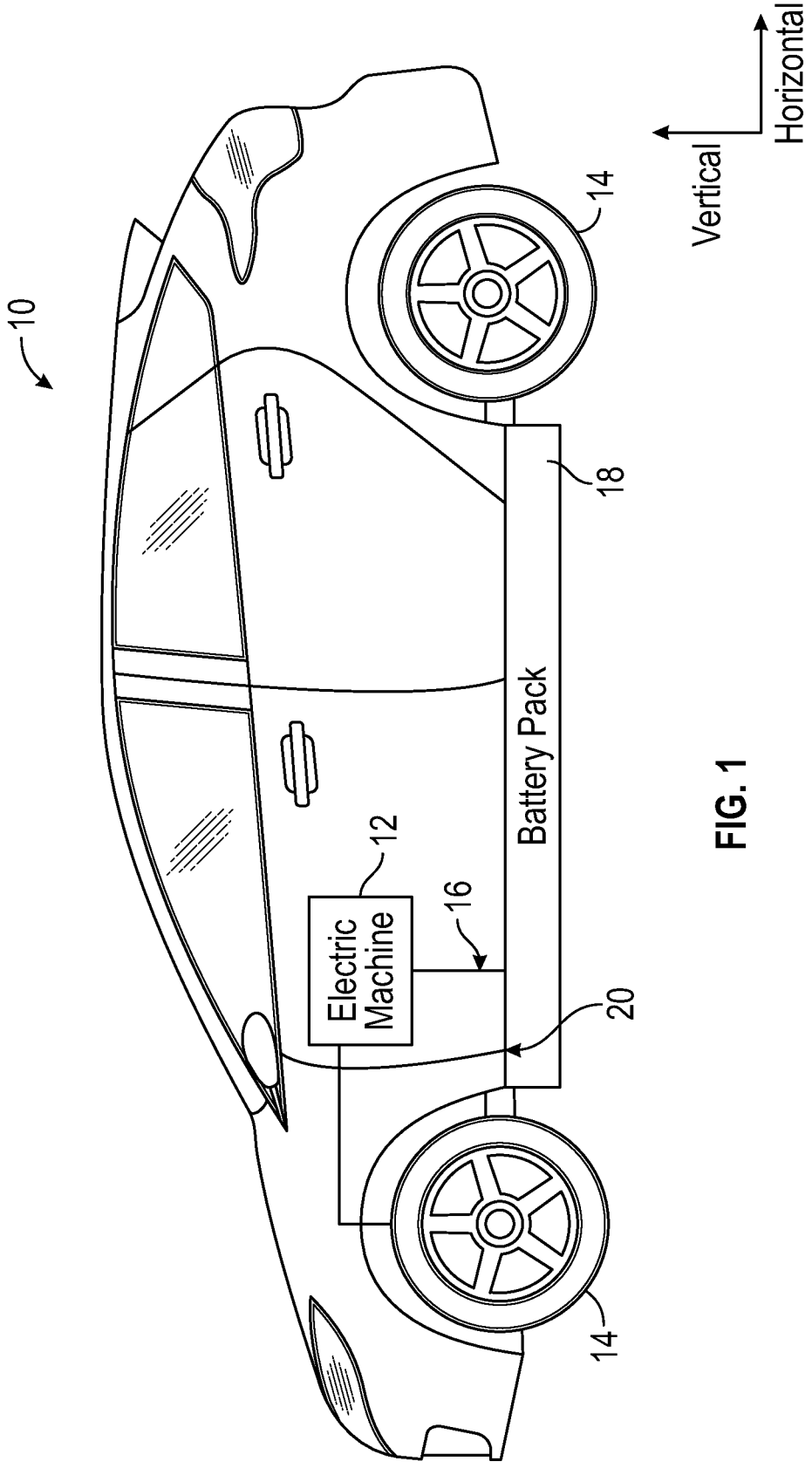
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the powertrain of the electrified vehicle 10 could be equipped with an internal combustion engine that can be employed either alone or in combination with other power sources to propel the electrified vehicle 10.

In the illustrated embodiment, the electrified vehicle 10 is depicted as a car. However, the electrified vehicle 10 could alternatively be a sport utility vehicle (SUV), a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more wheels 14 of the electrified vehicle 10.

A voltage bus 16 may electrically couple the electric machine 12 to a traction battery pack 18. The traction battery pack 18 is an exemplary electrified vehicle battery. The traction battery pack 18 may be a high voltage traction battery pack assembly that includes a plurality of battery cells capable of outputting electrical power to power the electric machine 12 and/or other electrical loads of the electrified vehicle 10. Other types of energy storage devices and/or output devices could alternatively or additionally be used to electrically power the electrified vehicle 10.

The traction battery pack 18 may be secured to an underbody 20 of the electrified vehicle 10. However, the traction battery pack 18 could be located elsewhere on the electrified vehicle 10 within the scope of this disclosure.

Figures 2, 3:
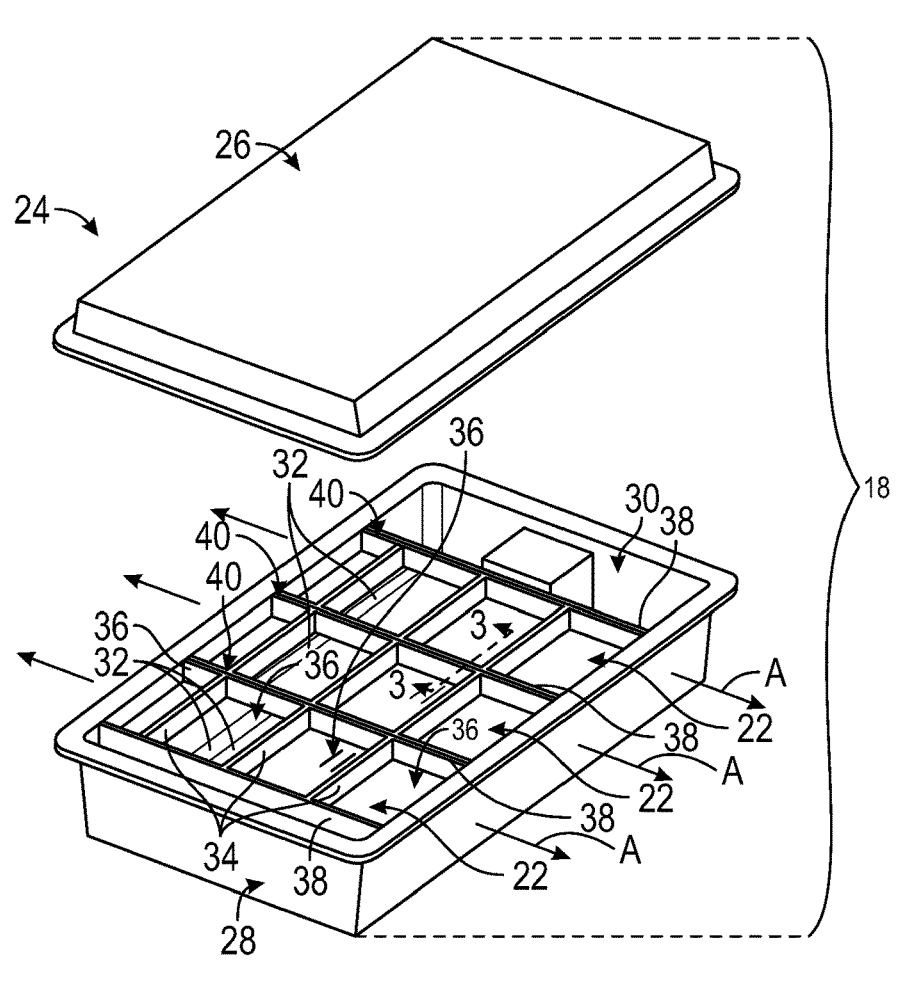
FIG. 2 is an exploded perspective view of a traction battery pack for an electrified vehicle.
FIG. 3 is a cross-sectional view through section 3-3 of FIG. 2.

FIGS. 2 and 3 illustrate additional details associated with the traction battery pack 18 of the electrified vehicle 10. The traction battery pack 18 may include a plurality of cell stacks 22 housed within an interior area 30 of an enclosure assembly 24. The enclosure assembly 24 of the traction battery pack 18 may include an enclosure cover 26 and an enclosure tray 28. The enclosure cover 26 may be secured (e.g., bolted, welded, adhered, etc.) to the enclosure tray 28 to provide the interior area 30 for housing the cell stacks 22 and other battery internal components of the traction battery pack 18.

Each cell stack 22 may include a plurality of battery cells 32. The battery cells 32 of each cell stack 22 may be stacked side-by-side relative to one another along a cell stack axis A. The battery cells 32 store and supply electrical power for powering various components of the electrified vehicle 10. Although a specific number of cell stacks 22 and battery cells 32 are illustrated in the various figures of this disclosure, the traction battery pack 18 could include any number of the cell stacks 22, with each cell stack 22 having any number of individual battery cells 32.

In an embodiment, the battery cells 32 are lithium-ion pouch cells. However, battery cells having other geometries (cylindrical, prismatic, etc.) and/or chemistries (nickel-metal hydride, lead-acid, etc.) could alternatively be utilized within the scope of this disclosure.

One or more structural thermal barriers 34 may be arranged along the respective cell stack axis A of each cell stack 22. The structural thermal barriers 34 may compartmentalize each cell stack 22 into two or more groupings or compartments 36 of battery cells 32. Each compartment 36 may hold one or more of the battery cells 32 within one of the cell stacks 22. In an embodiment, the battery cells 32 of each cell stack 22 are held within one of four compartments 36. However, other configurations, including configurations that utilize a greater or fewer number of compartments 36, could be used within the scope of this disclosure.

The battery cells 32 of each cell stack 22 may be arranged between a pair of cross-member beams 38. The cross-member beams 38 may be configured to hold the battery cells 32 and at least partially delineate the cell stacks 22.

The cross-member beams 38 may be adhesively secured to the enclosure cover 26 and to either the enclosure tray 28 or a heat exchanger plate 44 (see FIG. 3) positioned between the enclosure tray 28 and one or more cell stacks 22. The adhesive can seal these interfaces to inhibit battery cell vent byproducts escaping through these areas.

Immediately adjacent cross-member beams 38 may established a cross-member assembly 40 disposed between adjacent cell stacks 22 of the traction battery pack 18. The cross-member assemblies 40 may be configured to transfer a load applied to a side of the electrified vehicle 10, for example. Each cross-member beam 38 of the cross-member assemblies 40 may be a structural beam that can help accommodate tension loads from battery cell 32 expansion and compression loads. The cross-member assemblies 40 are therefore configured to increase the structural integrity of the traction battery pack 18.

The cross-member assembles 40 may also establish a battery pack venting system for communicating battery cell vent byproducts from the traction battery pack 18 during battery thermal events. For example, the cross-member assemblies 40 may establish passageways 42 (best shown in FIG. 3) that can communicate the battery cell vent byproducts from the cell stacks 22 toward a position where the battery cell vent byproducts can be expelled from the traction battery pack 18.

In the exemplary embodiment illustrated in FIG. 3, first and second adjacent cross-member beams 38 may establish a first side and a second side, respectively, of the passageway 42 of the cross-member assembly 40. Further, a vertically upper side of the passageway 42 may be established by the enclosure cover 26 or some other upper enclosure structure, and a vertically lower side of the passageway 42 may be established by a heat exchanger plate 44 positioned against the enclosure tray 28. In another embodiment, the heat exchanger plate 44 may be omitted and the vertically lower side of the passageway 42 may be established by the enclosure tray 28 or some other lower enclosure structure. Vertical and horizontal, for purposes of this disclosure, are with reference to ground and a general orientation of traction battery pack 18 when installed within the electrified vehicle 10 of FIG. 1.

Each cross-member beam 38 of the cell stack 22 may include a plurality of vent openings 56 for communicating battery cell vent byproducts through the beams and into one of the passageways 42. The vent openings 56 thus provide a path for battery cell vent byproducts to move through the cross-member beams 38 and into the passageways 42 as required during a venting event.

When the battery cells 32 of the cell stack 22 are not venting, the vent openings 56 may be covered by a sectioned membrane 58. A pressure differential increase associated with one or more of the battery cells 32 venting can rupture a local section of the sectioned membrane 58, thereby allowing the battery cell vent byproducts to pass through the vent openings 56 for a single battery cell 32 or group of battery cells 32 experiencing a thermal event into the passageway 42. The local sections of the sectioned membrane 58 may locally break away when the single battery cell 32 experiences the thermal event to release the battery cell vent byproducts into the passageway 42. The battery cell vent byproducts may exit on both sides of the cell stack 22.

In an embodiment, the cell stacks 22, the cross-member assemblies 40, and the respective passageways 42 extend longitudinally in a cross-vehicle direction in a mounted position of the traction battery pack 18. However, other configurations are further contemplated within the scope of this disclosure.

Figures 6, 7:
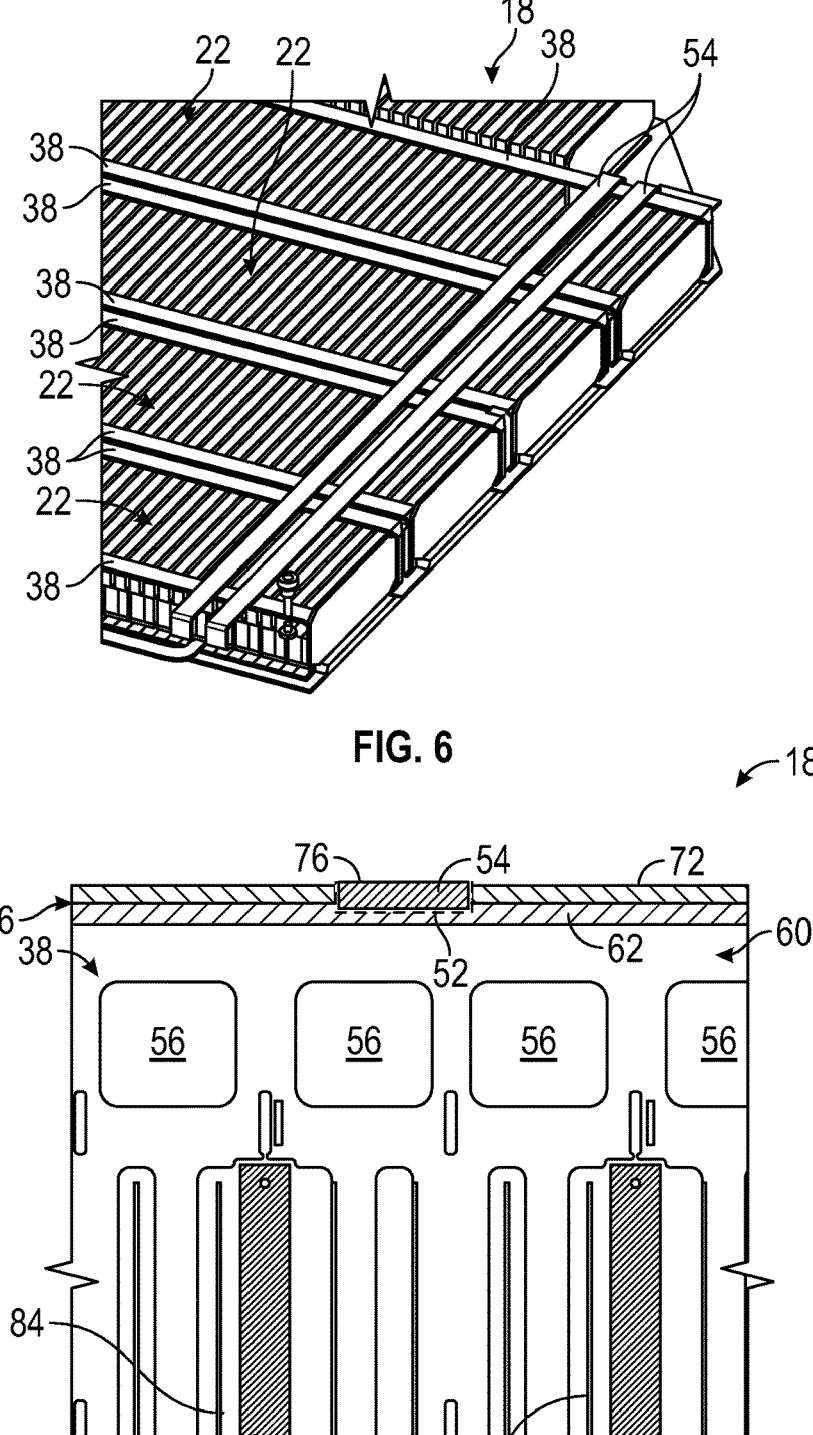
FIG. 6 illustrates bus bars routed over a plurality of cell stacks of a traction battery pack.
FIG. 7 is a cross-sectional view through section 7-7 of FIG. 5.
Figure 8:
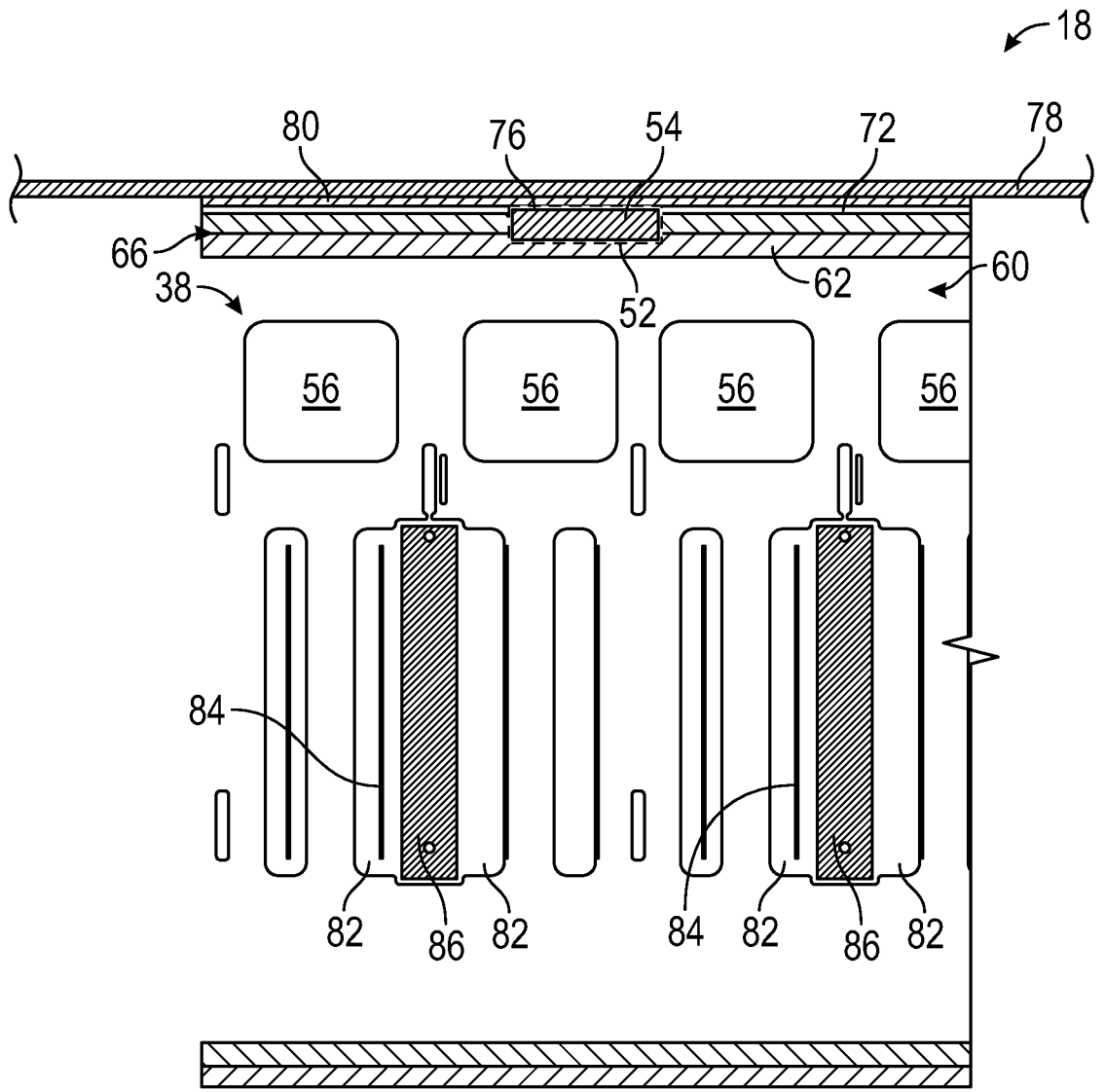
FIG. 8 illustrates an interface between a bus bar and an upper enclosure structure of a traction battery pack.

Referring to FIGS. 7-8 (with continued reference to FIGS. 2-3), each cross-member beam 38 may additionally include a plurality of cell tab openings 82 arranged vertically below the vent openings 56. Each cell tab opening 82 may be configured to accommodate a cell tab terminal 84 of the battery cells 32. The cell tab terminals 84 extend from a battery cell housing. An aluminum film may provide the battery cell housing, for example.

In an embodiment, each cell tab opening 82 may accommodate one cell tab terminal 84. In another embodiment, each cell tab opening 82 may be sized to receive cell tab terminals 84 from multiple adjacent battery cells 32. Battery vent byproducts may at least partially vent through each cell tab opening 82 in addition to the vent openings 56 during thermal events.

At least a portion of adjacent cell tab openings 82 may be separated by a backing tab 86 of the cross-member beam 38. The cross-member beams 38 may each include multiple backing tabs 86. Each backing tab 86 may provide a suitable backing surface for joining (e.g., welding) the cell tab terminals 84 together in order to electrically connect the battery cells 32 of each cell stack 22. The backing tab 86 may additionally provide a sense lead that can be used to collect data. For example, a voltage of the cell tab terminals 84 of the battery cells 32 may be monitored and collected by the backing tab 86.

Figure 4:
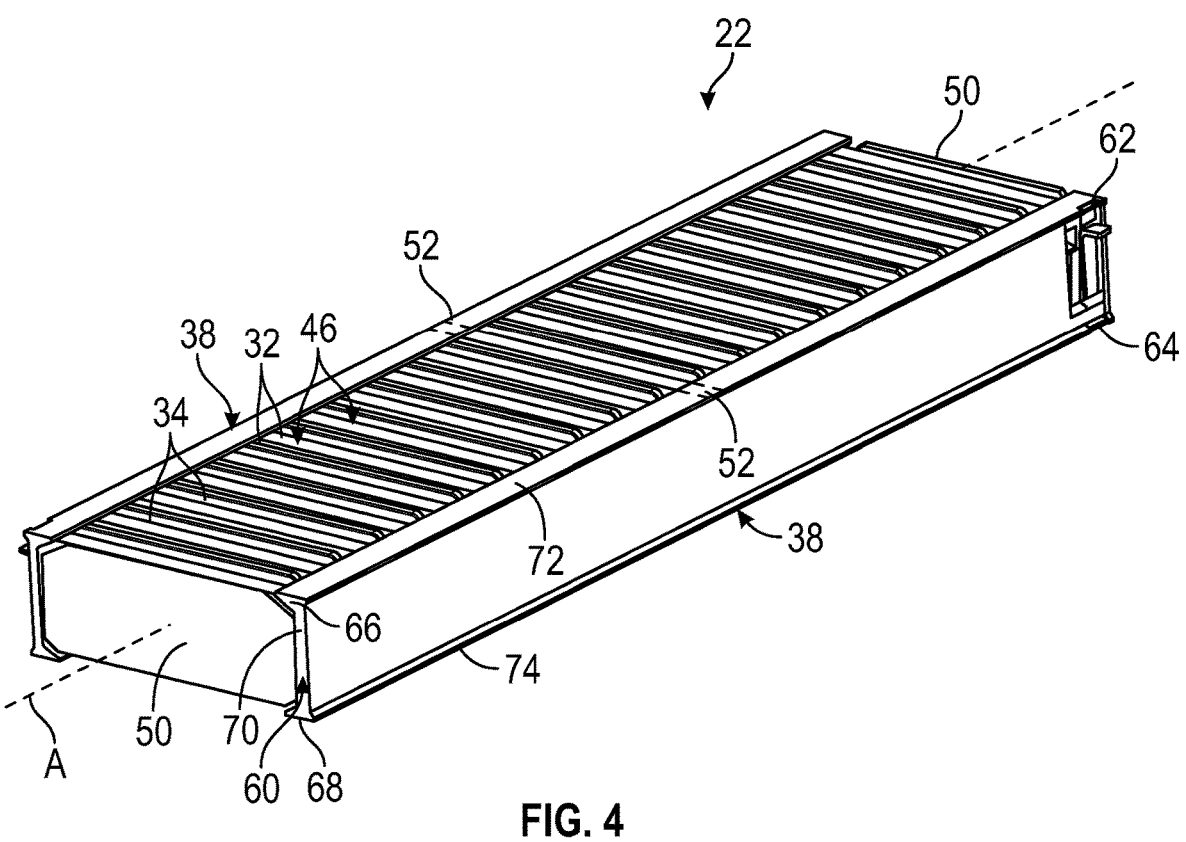
FIG. 4 illustrates an exemplary cell stack of a traction battery pack.
Figure 5:
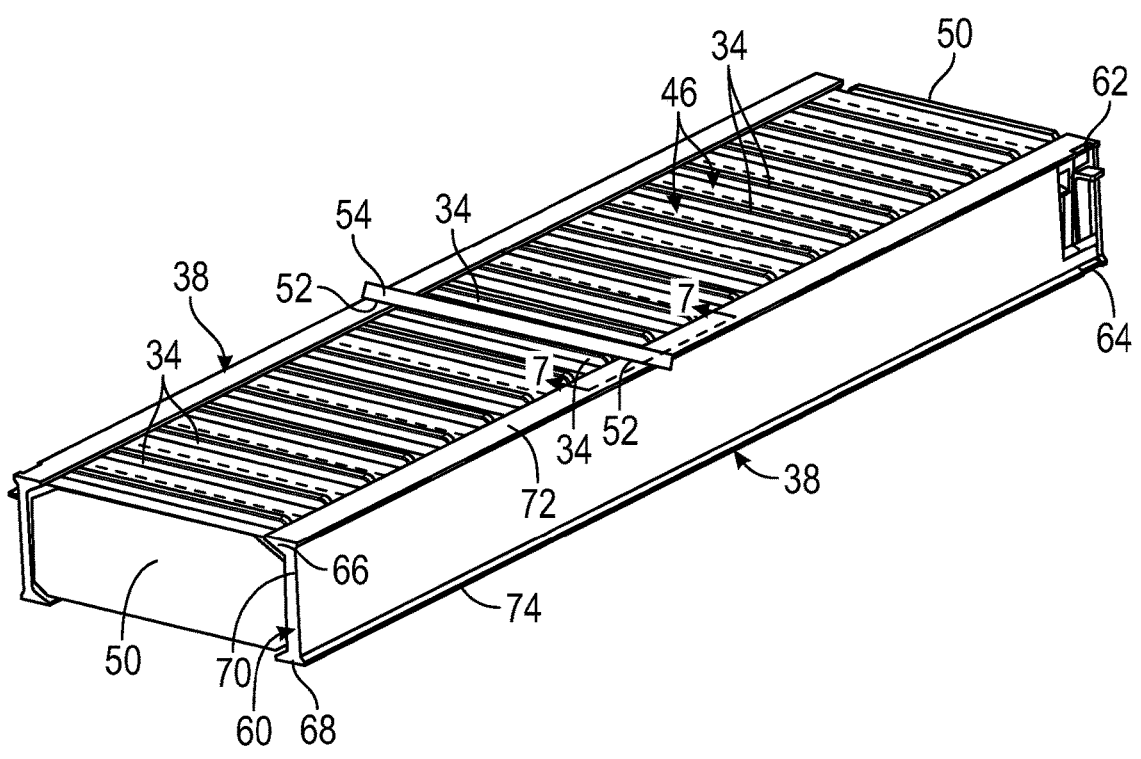
FIG. 5 illustrates a bus bar routing configuration that extends over top of a cell stack.

FIGS. 4-5, with continued reference to FIGS. 2 and 3, illustrate an exemplary design of a cell stack 22 of the traction battery pack 18. Additional cell stacks 22 of the traction battery pack 18 could include an identical design to the cell stack 22 shown in FIGS. 4-5, or a similar design as its electrical connections with neighboring cell stacks can vary in order to complete a necessary electrical circuit.

The cell stack 22 may include a plurality of cell packets 46 stacked horizontally between a pair of cross-member beams 38 and longitudinally (e.g., side-by-side along the cell stack axis A) between a pair of compression plates 50. The total number of cell packets 46 provided within the cell stack 22 may vary and is therefore not intended to limit this disclosure.

Each compression plate 50 may be made of a plastic material. The compression plates 50 may be configured to accommodate and maintain compression of the cell stack 22 along the cell stack axis A. The compression plates 50 may be attached to the cross-member beams 38 in any manner.

Each cell packet 46 of the cell stack 22 may include a plurality of battery cells 32. The total number of battery cells 32 provided within each cell packet 46 is not intended to limit this disclosure.

Each cell packet 46 may be separated from a neighboring cell packet 46 by one of the structural thermal barriers 34. The structural thermal barriers 34 may each include a single-piece structure or a multi-layered sandwich structure that is configured to slow or even prevent thermal propagation from cell packet-to-cell packet across the cell stack 22. In an embodiment, the structural thermal barriers 34 may be made of a metallic material, such as stainless steel or aluminum, or a thermoplastic material, for example. In another embodiment, the structural thermal barriers 34 include an insulating material(s), such as aerogel materials or foam materials. However, other materials or combinations of materials could with utilized to provide the structural thermal barriers 34 with insulative properties within the scope of this disclosure.

Each cross-member beam 38 of the cell stack 22 may include a notch 52 that is sized to accommodate one or more bus bars 54 (see FIG. 5). The bus bar 54 may be utilized to electrically connect the cell stack 22 to one or more adjacent cells stacks 22 of the traction battery pack 18. The bus bar 54 may laterally span across a width of the cell stack 22 and may thus be accommodated within the notch 52 of each opposing cross-member beam 38 of the cell stack 22. However, in other implementations, the bus bar 54 could span across multiple cell stacks 22 (see, e.g., FIG. 6). Once received within the notches 52 of the cross-member beams 38, the bus bar 54 may extend directly over top of one of the cell packets 46 of the cell stack 22. The bus bar 54 may further be disposed axially between adjacent structural thermal barriers 34 of the cell stack 22.

Each cross-member beam 38 may include a beam body 60 and one or more reinforcement sections. In an embodiment, the cross-member beam 38 includes an upper or first reinforcement section 62 and a lower or second reinforcement section 64. However, other configurations are also contemplated within the scope of this disclosure.

The beam body 60 may be a unitary structure that includes an upper portion 66, a lower portion 68, and a mid-portion 70 extending between and connecting the upper portion 66 and the lower portion 68. The upper portion 66 may establish an upper plateau 72 of the cross-member beam 38, and the lower portion 68 may establish a lower base 74 of the cross-member beam 38.

The beam body 60 may be made of any suitable thermoplastic material. In an embodiment, the beam body 60 is overmolded about each of the first reinforcement section 62 and the second reinforcement section 64. The first reinforcement section 62 may therefore extend inside the upper portion 66 of the beam body 60, and the second reinforcement section 64 may extend inside the lower portion 68 of the beam body 60. The first and second reinforcement sections 62, 64 may structurally reinforce select portions (e.g., stress areas) of the beam body 60.

In an embodiment, the beam body 60, the first reinforcement section 62, and the second reinforcement section 64 each include substantially equivalent lengths. In other implementations, the length of the beam body 60 (e.g., in the direction of the cell stack axis A) may be slightly greater than the respective lengths of the first and second reinforcement sections 62, 64.

In an embodiment, the first and second reinforcement sections 62, 64 are pultrusions, which implicates structure to these beam-like sections of each cross-member beam 38. A person of ordinary skill in the art having the benefit of this disclosure would understand how to structurally distinguish a pultruded beam structure from another type of structure, such as an extruded beam, for example.

The first and second reinforcement sections 62, 64 may be manufactured as part of a pultrusion process that utilizes a glass or carbon fiber (unidirectional or multidirectional mat) and a thermoset resin. A plurality of glass or carbon fiber strands may be pulled through the thermoset resin as part of the pultrusion process for manufacturing the first and second reinforcement sections 62, 64. The first and second reinforcement sections 62, 64 may then be overmolded by the beam body 60 to provide a desired cross-section of the cross-member beam 38.

The notch 52 may be formed in the upper portion 66 of the beam body 60. In an embodiment, the notch 52 extends from the upper plateau 72 down to the first reinforcement section 62. Accordingly, once received within the notch 52, the bus bar 54 is at least partially supported by the first reinforcement section 62, and an upper surface 76 of the bus bar 54 may be substantially flush relative to the upper plateau 72 of the upper portion 66 of the beam body 60 (see, e.g., the cross-sectional view of FIG. 7).

Referring now primarily to FIG. 8, the upper surface 76 of the bus bar 54 may interface with an upper enclosure structure 78 of the traction battery pack 18. The upper enclosure structure 78 may be part of the enclosure cover 26 or could be an intermediate structure between the bus bar 54 and the enclosure cover 26, for example. In some implementations, the bus bar 54 may be bonded to the upper enclosure structure 78 using an adhesive 80 in order to increase the stiffness across the traction battery pack 18. The adhesive 80 may be an epoxy based adhesive or a urethane based adhesive, for example. The upper plateau 72 of the upper portion 66 of the beam body 60 may also be bonded to the upper enclosure structure 78 by the adhesive 80.

The cell stack cross-member beams described herein are notched for routing bus bars over top of the cell stacks of a traction battery pack. The bus bars may therefore be conveniently nested within the cross-member beams without increasing the vertical or "z-axis" footprint of the traction battery pack.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
   a cell stack including a plurality of battery cells supported between a first cross-member beam and a second cross-member beam; and
   a bus bar positioned within a notch formed in the first cross-member beam or the second cross-member beam.

2. The traction battery pack as recited in claim 1, comprising a third cross-member beam positioned adjacent to the first cross-member beam to establish a cross-member assembly that separates the cell stack from a second cell stack of the traction battery pack.

3. The traction battery pack as recited in claim 2, comprising a venting passageway disposed between the first cross-member beam and the third cross-member beam.

4. The traction battery pack as recited in claim 1, wherein the notch is formed in the first cross-member beam, and further comprising a second notch formed in the second cross-member beam.

5. The traction battery pack as recited in claim 4, wherein the bus bar is received within the notch and the second notch and laterally spans across a top of the cell stack.

6. The traction battery pack as recited in claim 1, wherein the bus bar extends directly over top of a battery cell packet of the cell stack.

7. The traction battery pack as recited in claim 1, wherein the bus bar extends axially between a first structural thermal barrier and a second structural thermal barrier of the cell stack.

8. The traction battery pack as recited in claim 7, wherein a battery cell packet of the cell stack is arranged between the first structural thermal barrier and the second structural thermal barrier.

9. The traction battery pack as recited in claim 1, wherein the first cross-member beam includes a beam body, a first reinforcement section that establishes a first pultrusion within an upper portion of the beam body, and a second reinforcement section that establishes a second pultrusion within a lower portion of the beam body.

9

10

10. The traction battery pack as recited in claim 9, wherein the notch extends from an upper plateau of the upper portion to the first reinforcement section.

11. The traction battery pack as recited in claim 10, wherein an upper surface of the bus bar is flush relative to the upper plateau.

12. The traction battery pack as recited in claim 9, wherein the bus bar is supported by the first pultrusion.

13. The traction battery pack as recited in claim 1, wherein the bus bar spans across a width of the cell stack and at least a portion of a width of a second cell stack of the traction battery pack.

14. A traction battery pack, comprising:
a first cross-member beam;
a second cross-member beam;
a plurality of battery cells supported between the first cross-member beam and the second cross-member beam; and
a bus bar received within a first notch formed in the first cross-member beam and a second notch formed in the second cross-member beam and extending laterally over top of a cell packet of the plurality of battery cells.

15. The traction battery pack as recited in claim 14, wherein each of the first cross-member beam and the second cross-member beam includes a beam body and a first reinforcement section and a second reinforcement section configured to structurally reinforce the beam body.

16. The traction battery pack as recited in claim 15, wherein the first reinforcement section and the second reinforcement section are pultrusions of the first cross-member beam.

17. The traction battery pack as recited in claim 16, wherein the bus bar is supported by the first reinforcement section of the first cross-member beam and the second cross-member beam.

18. The traction battery pack as recited in claim 15, wherein the first notch extends from an upper plateau of the beam body to the first reinforcement section.

19. The traction battery pack as recited in claim 14, wherein the cell packet is a subgrouping of the plurality of battery cells that is positioned between a first structural thermal barrier and a second structural thermal barrier, and further wherein the bus bar extends axially between the first structural thermal barrier and the second structural thermal barrier.

20. A traction battery pack, comprising:
a first cross-member beam including a first thermoplastic beam body and a first reinforcement section that structurally reinforces the first thermoplastic beam body;
a plurality of battery cells supported by the first cross-member beam;
a bus bar extending laterally over top of at least at a portion of the plurality of battery cells; and
the bus bar is received within a first notch located at a first upper plateau of the first thermoplastic beam body and is at least partially supported within the first notch by the first reinforcement section.

* * * * *